United States Patent

Steward

[15] 3,648,747

[45] Mar. 14, 1972

[54] NUT AND PANEL ASSEMBLY AND METHOD OF MAKING SAME

[72] Inventor: John H. Steward, Bloomfield Hills, Mich.
[73] Assignee: Multifastener Corporation, Detroit, Mich.
[22] Filed: Oct. 20, 1969
[21] Appl. No.: 867,970

Related U.S. Application Data

[63] Continuation of Ser. No. 697,269, Dec. 19, 1967, abandoned.

[52] U.S. Cl. ........................................................151/41.73
[51] Int. Cl. ..................................................F16b 37/04
[58] Field of Search ......................................151/41.7–41.76

[56] References Cited

UNITED STATES PATENTS

| 3,314,138 | 4/1967 | Double | 151/41.73 |
| 3,315,345 | 4/1967 | Double et al. | 151/41.73 |
| 3,469,613 | 9/1969 | Steward | 151/41.73 |

Primary Examiner—Edward C. Allen
Attorney—Cullen, Settle, Sloman & Cantor

[57] ABSTRACT

A nut and panel assembly in which the nut has a pilot portion extending above outwardly directed flanges with undercut grooves in said flanges adjacent opposed sides of nut pilot portion. The assembly is produced by piercing the panel with the pilot portion of the nut and displacing the portions of the panel disposed above the undercut grooves into the grooves to fill the bottom portion of the grooves while maintaining a continuous connection between the deformed portions of the panel in the bottom of the grooves with the remainder of the panel.

2 Claims, 6 Drawing Figures

INVENTOR.
JOHN H. STEWARD.
BY
WILSON, SETTLE & BATCHELDER.
ATT'YS.

INVENTOR.
JOHN H. STEWARD.
BY
WILSON, SETTLE & BATCHELDER.
ATT'YS.

NUT AND PANEL ASSEMBLY AND METHOD OF MAKING SAME

This application is a continuation application of Ser. No. 697,269, filed Dec. 19, 1967, now abandoned.

BACKGROUND OF THE INVENTION

The present invention relates generally to a nut and panel assembly and more particularly to an improved method of assembling a nut and a panel and to an improved nut-panel assembly.

Various types of nuts have been employed in an effort to provide a construction which is simple and efficient in use and which will provide a strong union with the panel to which it is to be attached. One of the most successful prior art developments is a nut and panel assembly which receives a fastener, such as a bolt, and in which the nut and panel are secured together in a single operation. The nut utilized in this assembly is commonly referred to as the "Pierce nut."

One type of pierce nut which has been developed and has found remarkable success is disclosed in U.S. Pat. No. 3,315,345 which teaches piercing the panel with a pilot portion of the nut and then swagging or otherwise deforming into undercut grooves adjacent opposed sides of the nut pilot portion a portion of the panel. The deformed portion of the panel which is received into the grooves is severed from the remaining portion of the panel and is joined with the main portion of the panel by arcuate sections either intermediate the ends of the severed portion or adjacent the opposite ends thereof.

Although this assembly has found remarkable success in most installations, increased torque resistance may be required, e.g., in applications where a large amount of torque is applied to the threaded fastener received in the nut aperture.

SUMMARY OF THE INVENTION

According to the invention, an improved nut-panel assembly is provided which has increased retention capabilities to various types of forces which may be applied to the assembly.

The improved nut-panel assembly is produced by utilizing a nut having a central pilot portion extending above a surface of the nut with the surface having undercut grooves adjacent opposed edges defining the central pilot portion to define restricted mouth portions at the nut surface. During the assembly, the nut pilot pierces the panel to define an aperture corresponding to the size of the nut and the edges of the aperture above the undercut grooves are deformed into associated grooves. The panel portions received in the undercut grooves are connected to the main portion of the panel along the entire length of each groove to thereby provide increased capability of the assembly to resist torque and shear forces which may be applied to the assembly.

Additionally, the nut-panel assembly can be assembled to resist even more torque and shear forces by providing a nut having a continuous surface surrounding a rectangular pilot portion with the above mentioned undercut grooves adjacent two opposed sides of the nut pilot portion and planar grooves in the surface adjacent the remaining two sides of the nut pilot portion. In this assembly, the portions of the panel adjacent the aperture edges above the planar grooves are also displaced into the planar grooves to fill the bottoms of the planar grooves while maintaining a continuous connection with the main body of the panel.

Thus, the primary object of the present invention is to provide an improved nut-panel assembly which is capable of resisting torque and shear forces which may be applied to the assembly.

Another object is to provide an improved method of assembling a nut and a panel of the above type.

Other objects of this invention will appear in the following description and appended claims, reference being had to the accompanying drawings forming a part of this specification wherein like reference characters designate corresponding parts in the several views.

ON THE DRAWINGS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Furthermore, while the detailed description discloses four grooves adjacent the nut pilot portion, the broadest aspect of the invention is a nut-panel assembly with the nut having only two opposed flanges and undercut grooves in the two flanges with the panel metal in the grooves continuously joined with the main body of the panel.

AS SHOWN ON THE DRAWINGS

Figure 1A:
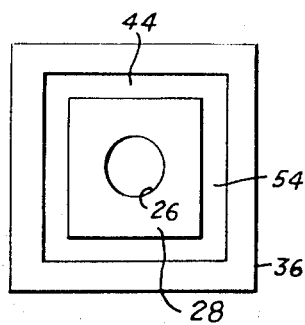
FIG. 1a is a plan view of the nut prior to assembly into the panel.
Figure 1:
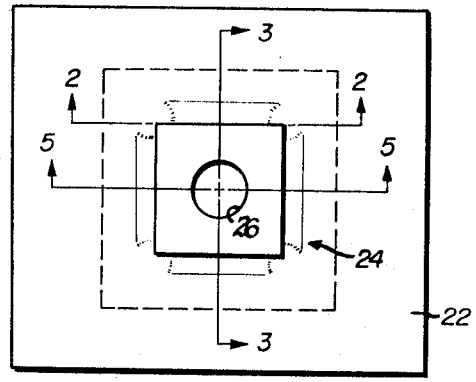
FIG. 1 is a plan view of the improved nut-panel assembly constructed in accordance with the method of the present invention.

In FIG. 1, the reference numeral 20 refers generally to a nut and panel assembly of the present invention and including a sheet metal panel 22 having assembled thereto a pierce nut generally indicated at 24.

Figure 3:
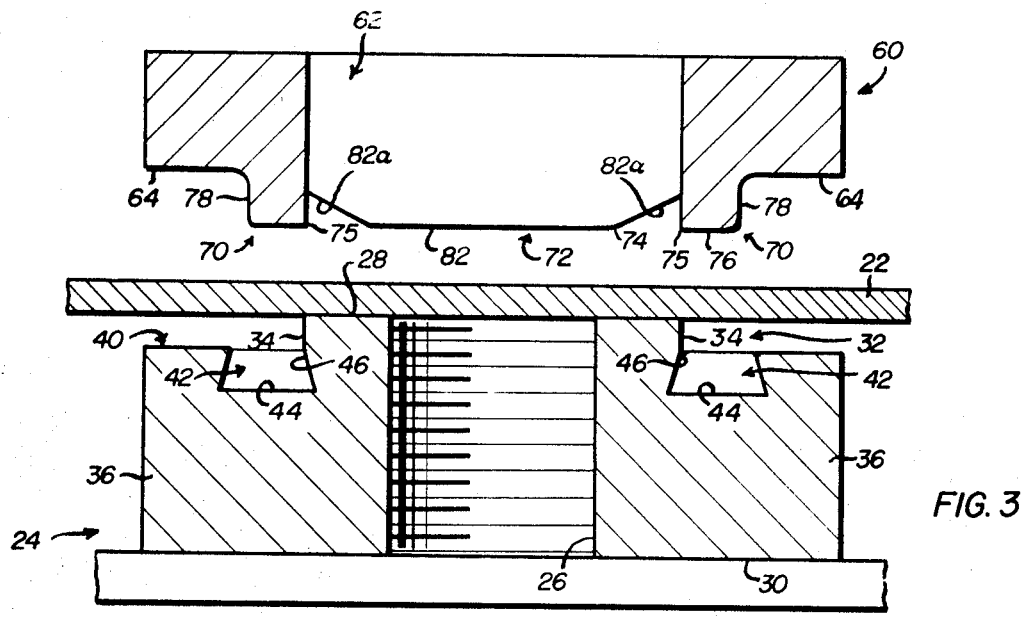
FIG. 3 is a section view taken along lines 3—3 of FIG. 1 of the nut and panel with a die button prior to assembly.
Figure 5:
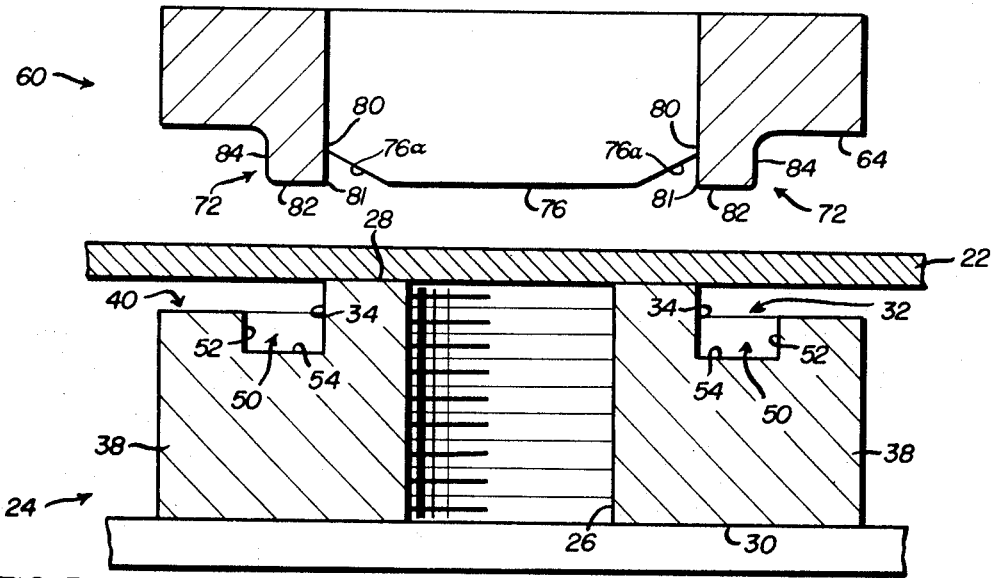
FIG. 5 is a vertical sectional view of the nut and panel assembly taken along lines 5—5 FIG. 1 and showing the nut and panel with a die button prior to assembly.

As best illustrated in FIG. 3 and 5, the nut 24 is provided with a central threaded aperture 26 opening onto end faces 28 and 30 of the nut. The end face 28 of the nut is defined by a centrally located nut pilot portion 32 which includes vertically extending side walls 34 blending into the end face 28 of the nut though right angular piercing corners. The main body portion of the nut is defined by pairs of opposed flanges 36 and 38 respectively extending outwardly from opposed sides 34 of the nut pilot portion. The flanges define a substantially continuous nut body surface 40 spaced below the end face 28 of the nut pilot portion a distance related to the thickness of the panel 22. For example, for use in panels 22 of from 0.025 to 0.075 inch in thickness, a nut having a pilot dimension of 0.025 may be used.

The flanges 36 each have a re-entrant groove 42 defined in the surface 40 adjacent the sides defining the nut pilot portion. The re-entrant grooves 42 have re-entrant openings or restricted entrant mouths defined at the surface of the flanges with the groove proper having a bottom wall 44 and intermediate upwardly and inwardly tapered groove side walls 46.

The opposite pair of opposed flanges 38 also have grooves 50 defined in the nut surface 40. Each of these grooves is planar in configuration and includes an inner wall which is an extension of the side wall 34 of the nut pilot, and outer wall 52 spaced from and parallel to the inner wall 34 with a bottom wall 54 parallel to and spaced below the surface 40.

The method of assembling the nut 24 and the panel 22 will be readily appreciated from a comparison of FIGS. 3, 4, 5 and 6 of the drawings. As illustrated, the nut 24 is disposed adjacent one surface of the panel 22 while a die button 60 is located adjacent the opposite surface with the die button displaced relative to the nut. Of course, it will readily be apparent to those skilled in the art that the nut may be fixed and the die button displaced relative to the fixed nut or vice versa. Additionally, both the nut and die button may be displaced towards each other with the panel interposed therebetween so that the nut and die button cooperate to sequentially pierce the panel nut pilot portion through the panel and then to deform portions of the panel surrounding the edges of the aperture defined therein.

A die button 60 utilized in producing the nut-panel assembly includes a central aperture 62 corresponding in size and configuration to the nut pilot portion 32. The die button 60 has a lower surface 64 disposed perpendicular to the axis of the aperture or opening 62. Opposed pairs of spaced projections 70 and 72 depend from the lower planar surface 64 and are integral with the body of the die button. As shown in FIG. 3, the projections 70 each include an inner wall 74 which is an extension of a wall defining the aperture 62. Each projection or embossment 70 further includes a lower wall 76 which is spaced below and substantially parallel to the planar surface 64 throughout a major portion of the length thereof and defines a piercing edge 75. However, as clearly shown in FIG. 5, the opposed ends of the surface 76 have portions 76a that generally merge with the lower planar surface 64 of the die button at the remote ends thereof. If desired the surface 76 may be planar throughout the length thereof.

The projections 70 also include outer walls 78 which are spaced from and substantially parallel to the inner walls 74 and merge at the lower ends with the lower walls 76 along a radiused corner while the upper end of each wall merges along a radiused corner with the planar lower surface 64 of the die button.

The projections 72 are substantially identical to the projections 70 and each include an inner wall 80 merging at a right angular piercing corner 81 with lower wall 82, which also has merging end portions 82a similar to portions 76a. Each projection 72 likewise includes an outer wall 84 which is spaced from and parallel to the wall 80 and merges at the lower end at a radiused corner with the wall 82 while merging at the upper end along a radiused corner with the planer lower surface 64 of the die button.

During the relative movement of the nut and die button, the edges of the end face 28 of the nut pilot portion 32 cooperate with the piercing edges 75 and 81 of the die button to punch or pierce the panel interposed therebetween and remove a slug 90 from the main body portion of the panel 22. As the slug 90 is being removed from the main body portion of the panel, one surface of the panel engages or bottoms on the nut surface 40 defined by the respective flanges 36 and 38. Continued relative movement of the nut and die button will cause the pierced edges defining the aperture in the panel to be displaced downwardly into the respective grooves 42 and 50 located adjacent each of the sides 34 of the nut pilot portion.

Figure 4:
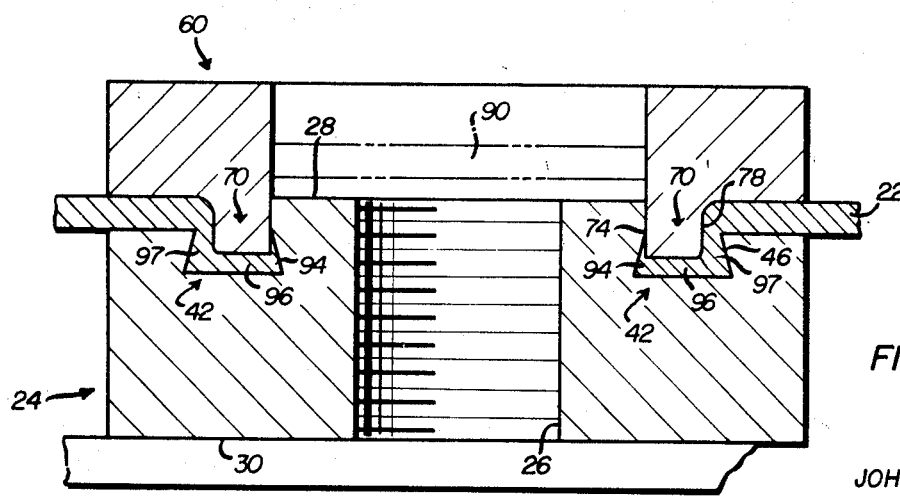
FIG. 4 is a view similar to FIG. 3 showing the nut and panel, with the die button, in the assembled condition.
Figure 2:
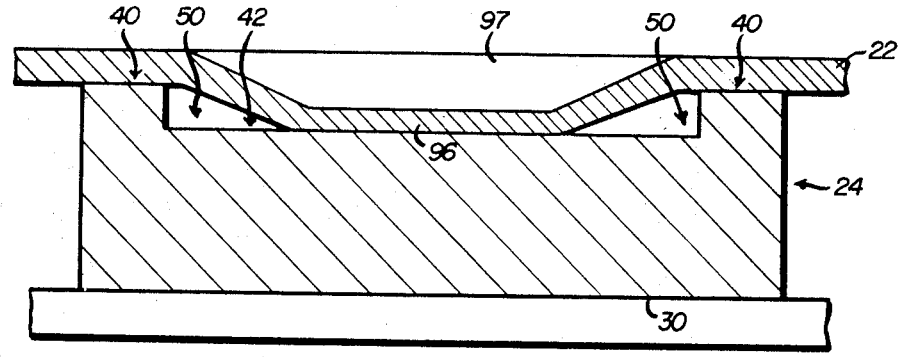
FIG. 2 is a vertical sectional view taken generally along lines 2—2 of FIG. 1.

As clearly shown in FIG. 4, the edges 94 are disposed within the re-entrant grooves 42 and the panel portion adjacent the edges is deformed within the grooves to completely fill the lower re-entrant portions of the groove with deformed panel metal 96. Also, the deformed portions 96 of the panel metal which are bottomed on a lower wall of the groove are joined along a continuous portion 97 to the main body or non-deformed portions of the panel 22. This deformation results from the specific configuration of the projections 70. Thus, as clearly shown in FIG. 4, the distance between the walls 74 and 78 of the projections 70 is slightly less than the width of the re-entrant portions of the grooves 42 and the length of each projection between the planer portion of wall 76 and the planar end face 64 of the die button is slightly more than the depth of the groove. Therefore, the panel metal adjacent the edges 94 must be deformed and displaced within the groove and bottom on the lower wall of the groove as well as the tapered side wall 46.

Figure 6:
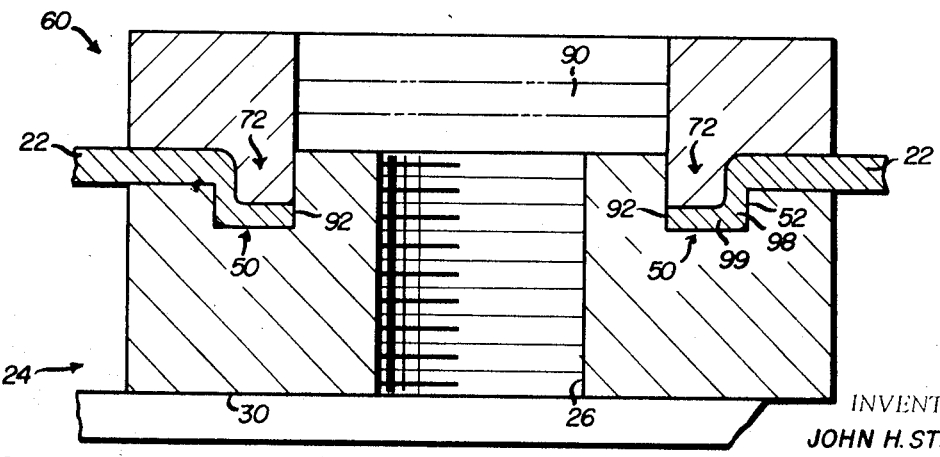
FIG. 6 is a view similar to FIG. 5 showing the nut and panel as well as the die button in the assembled position.

As clearly shown in FIGS. 5 and 6, the depth of the projections 72 from the reference surfaces 64 are likewise slightly more than the depth of the grooves 50 while the width of the projections between each of the side walls 80 and 84 is slightly less than the width of the rectangular groove 50. This will cause the portions 98 and 99 of the panel intermediate the main body of the panel and the edges 92 to be trapped between the projections and the walls of the grooves. Thus, the panel metal portions 99 will be deformed and displaced to completely fill the lower portion of the groove 50 while the portions 98 engage the side walls 52 of the groove. Again the portion of the panel 99 is joined along a continuous connection to the main body 22 of the panel by the portion 98.

It will readily be appreciated to those skilled in the art that the continuous connection between the deformed portions 96 and 99, bottomed in the respective grooves, with the main body portion of the panel 22 will greatly increase the resistance of the nut and panel assembly shown in FIG. 1 to any torque applied to the nut or shear forces which may be applied non-axially of the threaded opening.

If desired, the grooves 50 may be identical to the grooves 42 and the projections 72 of the die button modified to correspond to the dimensions of the projections 70. This will eliminate any orientation requirements when the nuts are assembled to the panels.

While one exemplary embodiment of the invention has been described in detail, it will be apparent to those skilled in the art that the disclosed embodiment may be modified. Therefore, the foregoing description is to be considered exemplary rather than limiting, and the true scope of the invention is tat defined in the flowing claims:

1. A nut and panel assembly comprising a nut and a panel, said nut having a rectangular pilot portion with flanges extending outwardly from opposed sides of said pilot portion and defining surfaces spaced below the free end of said pilot portion and means defining grooves in said surfaces adjacent said opposed sides, said means including bottom walls spaced below said surfaces, upwardly inner and outer side walls extending to said surfaces to define restricted openings along at least the length of the opposed sides of said pilot portion, said panel having aperture edges defined by piercing said panel with said nut pilot portion with a main portion of the panel bottomed on said surfaces, and first portions deformed around edges defined between said surfaces and said outer side walls in engagement with said outer side walls, and panel further having second portions between the aperture edges adjacent said opposed sides which are deformed to engage substantially the entire bottom and inner side walls of said grooves whereby to mechanically join said nut and said panels, said first panel portion and said second panel portion integral and continuous with said main panel portion.

2. In a nut and panel assembly, including a nut having a rectangular pilot portion extending above a continuous surface surrounding said pilot portion and said surface spaced below a free end thereof, said surface having a continuous groove adjacent the sides of said pilot with portions of said groove on opposite sides of said pilot having upwardly inclined inner and outer side walls continuous through said groove portions, said outer side wall merging with said surface to define restricted openings on opposed sides and portions adjacent the remaining sides having parallel inner and outer walls, said panel having aperture edges defined by piercing said panel with said nut pilot portion with a main portion of the panel bottomed on said surface, and first portions deformed around edges defined between said surface and said outer side wall in engagement with said outer side wall, said panel further having second portions between the aperture edges adjacent said opposed sides which are deformed to engage substantially the entire bottom and inner side walls of said restricted opening groove portions, spaced from said free end of the pilot portion, whereby to mechanically join said nut and said panel.

* * * * *